July 20, 1965 C. E. ATKINS ETAL 3,196,275
LIGHT SENSITIVE SLAVE UNIT
Filed March 6, 1961 3 Sheets-Sheet 1
Fig. 1.
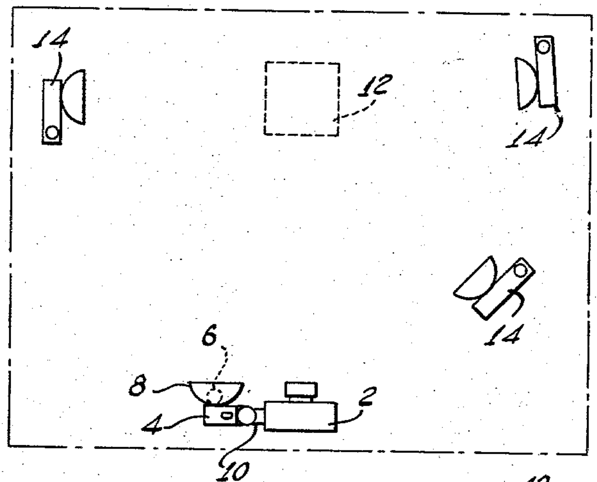
Fig. 2.
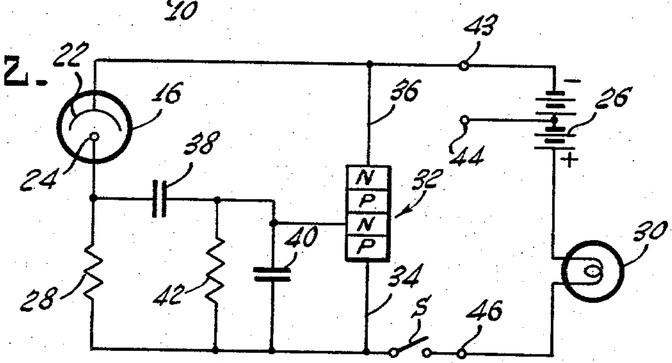
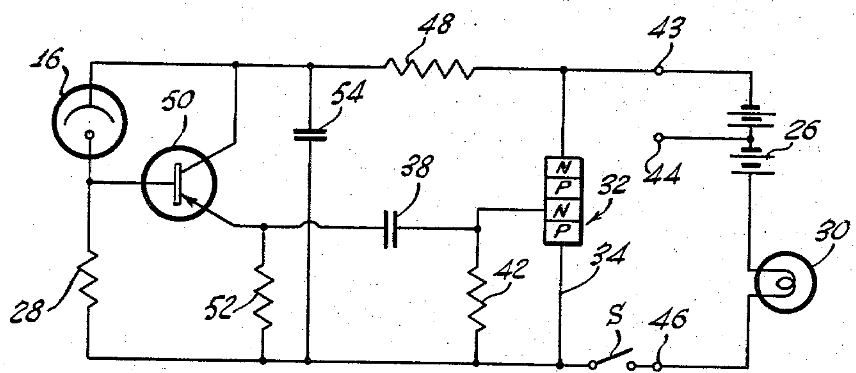
Fig. 3.
INVENTORS
CARL E. ATKINS
MATHEW A. SLAATS
BY
Eyre, Mann & Lucas
ATTORNEY INVENTORS
CARL E. ATKINS
MATHEW A. SLAATS
BY
Eyre, Mann & Lucas
ATTORNEYS LIGHT SENSITIVE SLAVE UNIT
Filed March 6, 1961
3 Sheets-Sheet 3
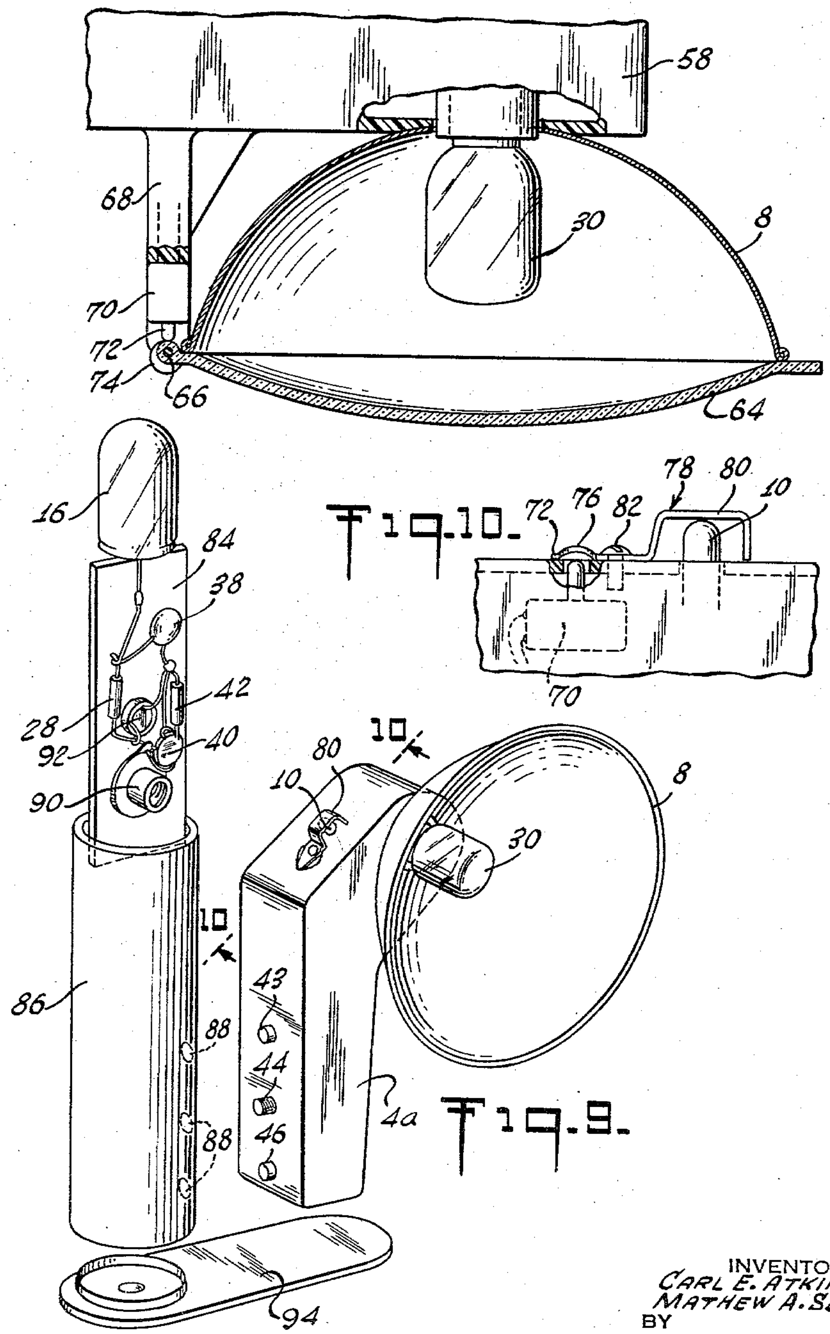
INVENTORS
CARL E. ATKINS
MATHEW A. SLAATS
BY
Eyre, Mann & Lucas
ATTORNEYS United States Patent Office 3,196,275
Patented July 20, 1965

1

3,196,275

LIGHT SENSITIVE SLAVE UNIT

Carl E. Atkins, West Orange, and Mathew A. Slaats, Livingston, N.J., assignors to Tung-Sol Electric Inc., a corporation of Delaware Filed Mar. 6, 1961, Ser. No. 93,574
5 Claims. (Cl. 250—217)

The present invention relates to devices triggered by reception of light and comprises a novel "slave" unit that is particularly adapted for use in photography for providing one or more spaced light sources triggered by light from a flashbulb at the camera. Although light responsive slave units for use in photography have heretofore been used, the problems involved in production of practicable units are formidable. For example, in order that the units may be spaced at substantial distances from the camera, sensitive light responsive elements are required. The use of sensitive light responsive elements at the slave units poses the problem of avoidance of false triggering when the level of illumination of the scene to be photographed is relatively high. Other problems involve the time delay between the flash at the camera and the flashing of the flashbulb at each unit. For the unit to be effective there must be light from its flash lamp while the camera shutter is open. This requirement precludes the use in a slave unit of relays or other time consuming devices. Another problem which had to be solved in developing the slave unit of the invention involved avoidance of hazard to the operator. When a burned out flash lamp is replaced in a slave unit transients set up in the unit during insertion of the lamp might cause premature explosion of the lamp while in the operator's hand.

The new slave unit, in the preferred embodiment thereof, includes means for rendering the unit highly sensitive to light of varying intensity while relatively non-sensitive to light of constant intensity. This permits each unit to be positioned a substantial distance from the camera even when the general level of illumination is high. The new unit responds with great rapidity to light from the camera flashbulb both because it is sensitive to rate of change of light intensity and hence is triggered by the start of the flash and also because no time consuming elements, such as relays, are included in the circuit of the unit. Interlocking means may be incorporated in the new unit for protection of the operator. The new slave unit thus solves the problems heretofore involved in development of a practical device. Moreover the new unit is of simple, compact and economical construction.

An element of the new slave unit is a semiconductor device which is connected in series with the lamp to be flashed across a low voltage source of direct current energy. A light sensitive device which may be a photoelectric tube or a light sensitive resistor is capacitatively coupled to the semiconudctor device so as to cause conduction thereof when light of varying intensity is received. In one embodiment of the invention the coupling circuit, between the light sensitive device and the semiconductor device includes a transistor amplifier. In another embodiment of the invention a separate light sensitive device is not required as the particular semiconductor device employed is itself light sensitive.

For a better understanding of the invention and of specific embodiments thereof, reference may be had to the accompanying drawings, of which:

FIG. 1 is a diagrammatic plan view showing a camera provided with a flashbulb and a number of slave units arranged about an object to be photographed, the slave units being those of the present invention.

FIGS. 2, 3, 4 and 5 are diagrams of various circuits embodying the invention which may be incorporated in the new slave unit;

FIG. 8 is an enlarged sectional view through the interlocking means of FIG. 7;

FIG. 9 is an isometric view of parts of a slave unit of the invention that may be coupled to a conventional flashbulb holder, the holder being shown provided with an alternative type of safety means; and FIG. 10 is an enlarged sectional view, partly in elevation, taken on the line 10—10 of FIG. 9.

Figure 4:
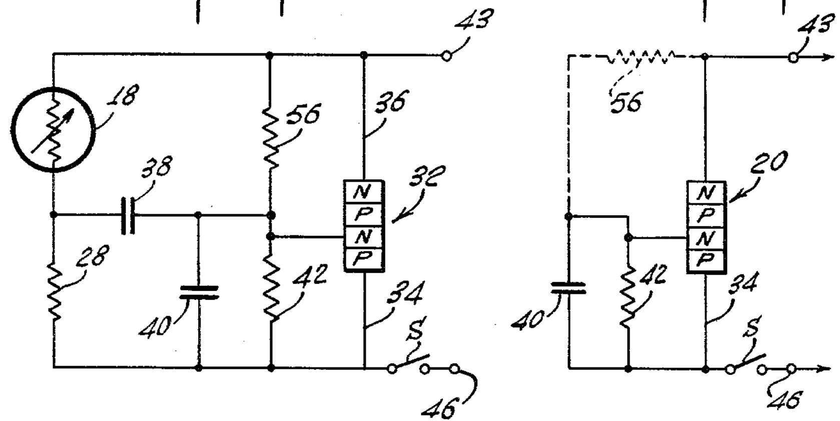

The slave units of the invention are adapted to be employed in a set-up such as diagrammatically shown in FIG. 1 wherein a camera of conventional construction is indicated at 2 with a lamp holder 4 connected thereto which contains the usual battery and wiring to a socket for reception of a flashbulb 6. A reflector 8 is mounted on the holder 4 and the holder is provided with the usual ejector pin 10 for removal of the spent bulb. The block 12 represents an object to be photographed and slave units 14 such as are to be described in connection with the remaining figures of the application are disposed in spaced relation to the object 12 and to the flash bulb 6 associated with the camera. Each unit 14 contains a light sensitive element, a flashbulb and reflector, a source of energy such as a battery and various circuit elements coupling the bulb to the light sensitive element and to the battery. The light sensitive element in a unit 14 may be a photoelectric cell such as shown at 16 in the circuit of FIG. 2 or a cadmium selenide cell such as indicated at 18 in FIG. 4, or the photosensitive element may be a semiconductor device such as is indicated at 20 in FIG. 5. Each unit 14, like the master unit at the camera, may be provided with an ejector pin 10.

One suitable circuit for a unit 14 is shown in FIG. 2 to which reference may now be had. In FIG. 2 the photoelectric cell 16, which may be a hard two-element tube, includes a photocathode 22 and an anode 24. The cathode 22 is connected to the negative terminal of a battery 26 and the anode 24 is connected through a high resistor 28, of say one megohm, to one socket terminal of a flash lamp 30, the other socket terminal of the lamp being connected to the positive terminal of the battery 26.

At 32 there is shown a four-zone three terminal semiconductor device. The end zone of p-type material functions as the emitter. It is connected by a lead 34 to the socket of lamp 30. The end zone of n-type material which functions as the collector, is connected through a lead 36 to the negative terminal of the battery. The inner n-type zone functions as a trigger electrode or base. When the trigger electrode is made negative with respect to the emitter the device conducts. The inner n-zone is connected through a capacitor 38 of about .1 microfarad to the anode 24 of the photoelectric tube and through a capacitor 40 of about .002 microfarad to the lead 34. A resistor 42 of about 10 kilohms is connected across the capacitor 40. With the above described circuit, if the photocathode 22 is not illuminated the semiconductor device 32 is non-conductive and hence the light 30 is not flashed. This is because there will be no current flow through resistor 42 and hence the potential of the inner n-zone will be that of the emitter. If light of constant intensity floods the photo-cathode, there will be a small direct current through tube 16 and resistor 28 but, because of the capacitor 38, no triggering potential will be applied to the trigger grid of the semiconductor device 32. When the flashbulb of the camera attachment is ignited, the sudden sharp increase in light intensity falling on the photocathode 22 produces a rapidly increasing current through the tube 16 causing a negative voltage pulse at the trigger electrode of device 32 and consequent conduction thereof. Lamp 30 is then flashed, breaking its own circuit and thereby returning device 32 to the non-conductive condition. When a new flashbulb is being inserted into its socket, after ejection of the spent bulb, transient currents generated by contact of the base of the new bulb with the socket might trigger the relatively sensitive semiconductor device with consequent premature explosion of the flashbulb and while in the operator's hand. The provision of the small capacitor 40 interconnecting the trigger grid and emitter of the semiconductor device tends to prevent triggering of the device by such transients. Preferably additional safety measures to be described in connection with FIGS. 7, 8, 9 and 10 are incorporated in the new unit.

The only element in the circuit of FIG. 2 which incorporates any delay is the flash lamp 30 itself. Various flashbulbs are commercially available and by selection of a particular bulb having quick response the unit can be so made that its flashbulb will be ignited in ten milliseconds or less after flashing of the lamp in the camera. It will be appreciated that the selection of lamps will depend in part upon the camera adjustment of timing of the shutter relative to contact closing.

Figure 7:
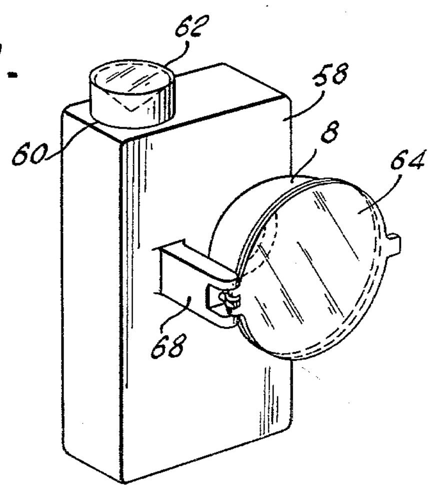
FIG. 7 is an isometric view of a slave unit embodying the invention and provided with interlocking means for protection of the operator.

The circuit of FIG. 2 may be mounted within a single casing such as is shown in FIG. 7. The casing will be provided with an opening in the upper part through which the light sensitive element extends for exposure to light from the camera flashbulb. Alternatively the battery 26 and lamp 30 may be in a separate unit such as the unit 4 of FIG. 1 and the remainder of the circuit of FIG. 2 incorporated in a casing to which can be plugged the unit containing the battery and flashbulb. The junctions indicated at 43, 44 and 46 in FIG. 2 represent coupling means between a unit such as indicated at 4 in FIG. 1 and an enclosure containing the remainder of the circuit. FIG. 9, hereinafter to be described, discloses one physical construction of slave unit for coupling to a separate holder for the battery and flashbulb.

A circuit employing a transistor amplifier is shown in FIG. 3. As in the case of the circuit of FIG. 2 all of the elements may be contained within a single casing or those elements shown on the left of junction points 43, 44 and 46 may be separately encased. In the circuit of FIG. 3 the photoelectric cell 16 has its anode connected through resistor 28 to junction 46 and its cathode connected through a load resistor 48 of about one kilohm to the junction 43. The anode of the photoelectric cell 16 is also connected to the base of a transistor amplifier 50 the collector of which is connected to the photocathode and the emitter of which is connected through capacitor 38 to the trigger grid of semiconductor device 32. The emitter of the semiconductor device 32 is connected to junction 46 and the collector of the semiconductor device is connected to junction 43 as in the circuit of FIG. 2. A resistor 52 is connected between the emitter of transistor 50 and junction 46 and resistor 42 is connected between the trigger grid of device 32 and junction 46 as in the circuit of FIG. 2. A capacitor 54 connected across the transistor 50 and the resistor 52 serves the function of capacitor 40 of FIG. 2 in protecting against premature flashing of the lamp during insertion thereof into its socket. Resistor 28 in this embodiment of the invention may be about 330 kilohms, resistor 42 about 22 kilohms, capacitor 38 about 10 mfd. and capacitor 54 about .01 mfd.

In operation of the circuit of FIG. 3, light falling on the photocathode of tube 16 causes the tube to conduct, lowering the potential of the base of transistor amplifier 50. An amplified current is then passed by transistor 50 but, unless the light intensity varies, the device 32 will not be rendered conductive because of the provision of capacitor 38. Because of resistors 48 and 52 the current through transistor 50 will be insufficient to flash the lamp 30. When varying light strikes the photocathode, the amplified varying current through transistor 50 produces a negative pulse at the trigger grid sufficient to render device 32 conductive for flashing the lamp 30.

The circuit of FIG. 4 is substantially the same as that of FIG. 2 except that the photoelectric tube 16 is replaced by a light sensitive resistive element 18 of cadmium selenide, for example, and a resistor 56 is connected between the collector and trigger grid of the semiconductor device 32, resistors 42 and 56 serving, in effect, as a potential divider. As in the circuits previously described, the capacitor 38 prevents flashing of the lamp when light of constant level of intensity is incident on the light sensitive element and capacitor 40 tends to prevent conduction by device 32 should transients be generated by insertion of a flashbulb into its socket. The battery and flashbulb are not illustrated in FIG. 4 but the junctions 43 and 46 across which these elements are serially connected are indicated in the circuit drawings.

In the description so far given of circuits suitable for use in the slave unit of the invention the semiconductor device has been diagrammatically shown and described as a four zone device triggered by application of a negative pulse to the inner n-type zone. Obviously any three or four zone semiconductor device that can be pulse triggered could be employed in the circuits of FIGS. 2, 3 and 4. For example, a silicon controlled rectifier, which is essentially a solid state thyratron, and which conducts when a positive pulse is applied to the control electrode, could be substituted for the device 32 in each of these figures. Triggering by a positive pulse rather than by a negative pulse, requires only that the polarity of battery 26 be reversed and, when a photo cell is employed, that the connections to the photocathode and anode be reversed. Preferably the semiconductor device should require relatively low operating voltage and have a quick turn-on time. One such device that has been found particularly suitable for use in units of the invention is the four zone germanium device, which is switched on, or conducting, by biasing its base negative with respect to its emitter and which is switched off, or non-conducting, by biasing its base positive with respect to its emitter. This four layer germanium device is commercially identified as a TS–1182 and described in a paper by Fidler, Carlat and Wegener presented at the 1960 electronic components conference, reprints of which are available from the "Proceedings." This device has a quick turn "on" time of the order of 0.1 microsecond, or less, and requires but low operating voltage of the order of three volts. Moreover, we have found that this device is itself sufficiently photo-sensitive to be used as the light sensitive element of the new slave unit, with consequent reduction in the number of circuit components.

Figure 5:
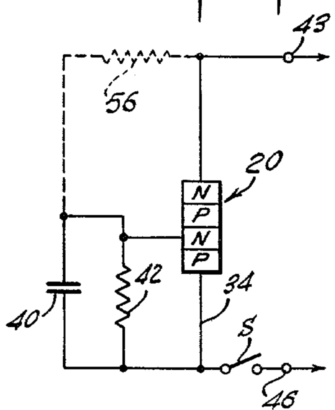

FIG. 5 is a circuit diagram utilizing the TS–1182 in the slave unit both as the light sensitive device and as the semiconductor switching device for the flash lamp. The TS–1182, identified in FIG. 5 by the reference numeral 20, has its collector connected to junction 43, its emitter connected to junction 46 and its trigger grid or base connected through capacitor 40 and resistor 42 to junction 46. Resistor 56 is shown connected across the base or trigger grid and collector terminals.

When photons strike the device 20 in the neighborhood of the junctions between zones of different type conductivity the number of charge carriers increases. When the level of light intensity is sufficiently high, the device is triggered and passes high enough current to flash the lamp. It has been found that a general illumination of the device is all that is necessary for triggering. Concentration of a light beam at any specific junction is not essential. Although in FIG. 5, the capacitor 40 and resistors 42 and 56 have been shown as elements of the circuit these elements are not essential as the TS–1182 can be triggered by light even with the base or trigger electrode floating.

Units incorporating the circuits of FIGS. 2, 3, 4 and 5 can be triggered at distances from the camera flashbulb of over sixteen feet with time delays of less than ten milliseconds.

Figure 6:
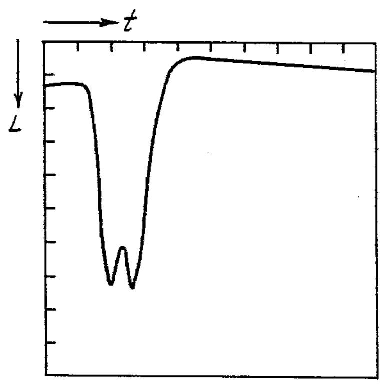
FIG. 6 is a graph representing typical response of a slave unit to light from a camera flashbulb.

FIG. 6 is a graph representative of the operation of units equipped with the circuits of the invention. In FIG. 6 the abscissae represent time intervals of ten milliseconds and the ordinates voltage in intervals of .01 volt. The graph is that shown by a "memoscope" and photo responsive circuit in which negative voltage corresponds to light intensity. The first negative peak of the curve of FIG. 6 was caused by the flash of the camera bulb positioned sixteen feet from a slave unit of the invention. The second negative peak of the curve was caused by the flash from the slave unit. It will be noted that the time interval between the two peaks of the curve is about seven milliseconds and that the slave unit flashed during the time that the light level from the camera flashbulb was still high.

FIG. 7 illustrates a suitable design of casing for a slave unit of the invention and, together with the view of FIG. 8, shows one arrangement for protecting an operator during insertion of a flashbulb in its socket. The casing 58 of FIG. 6, which encloses all of the circuit elements, including the battery, has an opening 60 in the upper wall thereof for exposure to light of the light sensitive element of the circuit and an opening in the side wall thereof for reception of the lamp base. The reflector 8 is mounted about the periphery of the side wall opening.

If the casing 58 contains a circuit such as that of FIGS. 2 and 3 in which photoelectric tube 16 is used, then the tube itself would extend through the opening 60 in the upper wall of the casing. If the light sensitive element of the circuit is a device such as the element 18 of FIG. 4 then the element terminates either flush with the upper wall of the casing or slightly therebelow and, as specifically shown in FIG. 7, a light reflecting and directing element 62 is positioned above the photosensitive unit to direct light downwardly onto the photosensitive element. The light reflecting element 62 may be, for example, in the form of an inverted cone having mirrored surfaces which direct light falling on the side walls downwardly to the opening 60. Where the light responsive element of the unit is the TS–1182 of FIG. 5, it is positioned above the aperture 60 and preferably enclosed in a glass protective shield.

In the embodiment of the invention shown in FIGS. 7 and 8, the reflector 8 is provided with a transparent door 64 which extends over the flashbulb and which at one side is fixed to a pin 66 (see FIG. 8). Pin 66 is rotatably mounted in bifurcations of a bracket 68 extending out from the casing wall. As shown in FIG. 8 the bracket 68 has mounted therein a microswitch 70, the operating plunger 72 of which is engaged by a cam 74 fixed to the pin 66. Microswitch 70 is normally closed but when the cover 64 is rotated to open position for replacement of a flash lamp the plunger 72 is depressed by the cam 74 and the microswitch is opened, opening the circuit of the semiconductor device within the casing 58. In the circuit diagrams of FIGS. 2 through 5 a switch S is shown in the lead to junction 46. Such switch S may be considered as the microswitch 70 or can be coupled within the casing to the microswitch for opening when the cover 64 is open. The switch S may be located as indicated in the circuit drawings or may be in the lead 34 from the emitter of the semiconductive device. Alternatively the switch may be in the part of the circuit shown to the right of the junctions 43 and 46 of FIGS. 2 and 3, all depending upon the particular geometry of the enclosure of the slave unit.

As heretofore suggested one convenient construction of slave unit, in accordance with the invention, is to enclose the elements on the left of the junctions 43, 44 and 46 in a casing so shaped as to be readily attachable to a conventional flashbulb holder such as that indicated at 4 in FIG. 1. Such an arrangement is illustrated in FIG. 9 wherein the conventional lamp holder is indicated by the reference numeral *4a*. In the particular embodiment of the invention illustrated in FIG. 9 the holder *4a* differs from the conventional holder only in the addition of a safety feature including a microswitch 70 (see FIG. 10) which is mounted within the unit *4a* and controls the connections between the battery and lamp socket. The switch is closed only when the operating plunger 72 thereof is engaged and depressed by an arm 76 of a pivotally mounted member 78, the other arm 80 of the member extending over the ejector pin 10. With this arrangement, in order to manipulate the ejector pin for disposal of the spent flashbulb, the member 78 must be rotated about its pivot pin 82. The plunger 72 of the microswitch 70 is thereby released and moves into position to open the battery circuit within the casing *4a*. Thus when the new bulb is inserted the circuit to the semiconductor device will be open until the bracket 78 is returned into position with the arm 80 thereof over the ejector button and the arm 76 thereof in engagement with the plunger 72 of the microswitch.

The part of the circuit of the slave unit on the left of the junctions 43 and 46 is mounted on a board 84 contained within a cylindrical casing 86. The casing 86 has three holes 88, aligned with junctions 43, 44 and 46 on the unit *4a*, junction 44 being merely a mechanical coupling between the casing 86 and the holder *4a* and junctions 43 and 46 being electrical connections to the circuit mounted on the board 84. In the particular embodiment of the invention illustrated in FIG. 9 the light sensitive device is a photoelectric tube 16 and the circuit elements shown mounted on the board 84 are those of the circuit of FIG. 2. The annular fitting 90 in the lower end of the board 84 receives the junction 46. One end of each of the resistors 42 and 28 and one terminal of capacitor 40 are connected thereto. The semiconductor device 32 is not seen in the view of FIG. 9 as it is mounted on the other side of the board 84. Connections to the device 32 are made through an opening 92 in the board 84 and into which extends the junction 43 of holder *4a*. The casing 86 and holder *4a* may be conveniently mounted on a base 94. Obviously the circuit of FIGS. 3, 4 and 5, instead of that of FIG. 2, could be mounted within the cylindrical casing 86 and light sensitive elements other than the photoelectric cell 16 could be employed in the particular construction of FIG. 9.

The invention has now been described with reference to several embodiments thereof. In each of the circuits of the drawings the new unit is sensitive primarily to rate of change in light intensity rather than to level of intensity. This is not true of the simple circuit of FIG. 5 wherein the semiconductor device is itself the light sensitive element. However, even in this simplified arrangement it has been found that the unit will operate satisfactorily at substantial distances from the camera and with a relatively high level of ambient light without premature flashing of the slave carried flashbulb. Obviously various changes in the particular construction of the units and in the particular circuit elements disclosed could be made without departing from the spirit of the inveniton and the scope of the accompanying claims.

The following is claimed:

1. A remotely controlled flash unit comprising a four layer semiconductor switching device having a gate, emitter and collector, said device being of the type which is switched on by biasing its gate with respect to its emitter with voltage of one polarity and is switched off by biasing its gate with respect to its emitter with voltage of the opposite polarity, a low voltage battery and a flashbulb socket connected in series with the emitter and collector of the four layer semiconductor switching device so that all current drawing circuits through said source will be open when said flashbulb socket is empty, a photosensitive means and a resistor connected in series between the emitter and the collector of the four layer semiconductor switching device, and circuit means coupling the junction of the photosensitive means and the resistor to the gate of the four layer semiconductor switching device to bias the four layer semiconductor switching device nonconducting and to transmit changes in current flow through the photosensitive means to the gate of the four layer semiconductor switching device and thereby triggering the four layer semiconductor switching device conducting when a flashbulb is properly inserted in said flashbulb socket, said circuit means including a differentiating circuit means which prevents steady state current flow through the photosensitive means from triggering the four layer semiconductor switching means conductive and capacitive circuit means which prevents current transients due to insertion of flashbulbs in the flashbulb socket from triggering the four layer semiconductor switching device conductive.

2. The slave unit according to claim 1 wherein said last mentioned means includes a switch in said circuit and wherein said unit is provided with a cover over said lamp which is so coupled to said switch that the switch is open when said cover is moved to permit insertion of a lamp into its socket.

3. The remotely controlled flash unit of claim 1 wherein the electronic circuit element means is a capacitor connected between the gate and emitter of the four layer semiconductor switching device.

4. The remotely controlled flash unit of claim 1 wherein the electronic circuit element means is a transistor amplifier means coupled between the mentioned junction and said differentiating circuit means.

5. The remotely controlled flash unit of claim 3 wherein said four layer semiconductor switching device is a PNPN germanium device.

References Cited by the Examiner

UNITED STATES PATENTS

| | | | |
|---|---|---|---|
| 2,546,734 | 3/51 | Farber | 250—214 X |
| 2,863,988 | 12/58 | Schwartz et al. | 240—1.3 |
| 2,944,165 | 7/60 | Stuetzer | 307—88.5 |
| 2,952,818 | 9/60 | Russel et al. | 307—88.5 |

OTHER REFERENCES

Cartier et al.: "Electronics Switch," IBM Technical Disclosure Bulletin, vol. 3, No. 6, pp. 44–45, November 1960.

RALPH G. NILSON, *Primary Examiner.*

RICHARD M. WOOD, *Examiner.*